United States Patent [19]
Levenez

[11] Patent Number: 5,052,433
[45] Date of Patent: Oct. 1, 1991

[54] STARTER CONNECTION FOR PROGRESSIVE PRESSURIZING OF PNEUMATIC INSTALLATIONS

[75] Inventor: Yves Levenez, Vaux le Penil, France
[73] Assignee: Legris SA, Rennes, France
[21] Appl. No.: 425,182
[22] PCT Filed: Feb. 7, 1989
[86] PCT No.: PCT/FR89/00049
§ 371 Date: Oct. 4, 1989
§ 102(e) Date: Oct. 4, 1989
[87] PCT Pub. No.: WO89/07727
PCT Pub. Date: Aug. 24, 1989

[30] Foreign Application Priority Data
Feb. 9, 1988 [FR] France ............... 88 01722

[51] Int. Cl.⁵ ............................................. F16K 15/06
[52] U.S. Cl. ................................ 137/513.3; 137/509; 137/513.7; 137/556; 137/599.2; 251/152
[58] Field of Search ............... 137/513.3, 513.5, 513.7, 137/599, 494, 509, 556, 599.2; 251/148, 152

[56] References Cited
U.S. PATENT DOCUMENTS

| | | | |
|---|---|---|---|
| 999,861 | 8/1911 | Phillians | 251/152 X |
| 2,299,847 | 10/1942 | Price | 137/599 X |
| 2,304,404 | 12/1942 | Flanagan . | |
| 2,732,169 | 1/1956 | Matteo | 137/148 |
| 2,766,593 | 10/1956 | Mitchell | 137/509 |
| 3,683,959 | 8/1972 | Tsuji | 137/513.5 X |
| 4,192,346 | 3/1980 | Iizumi | 137/509 |
| 4,415,001 | 11/1983 | Kent . | |

FOREIGN PATENT DOCUMENTS

| | | |
|---|---|---|
| 8426955 | 2/1986 | Fed. Rep. of Germany . |
| 2273180 | 12/1975 | France . |
| 2343280 | 9/1977 | France . |
| 2383377 | 10/1978 | France . |
| 2597954 | 10/1987 | France . |

Primary Examiner—Stephen M. Hepperle
Attorney, Agent, or Firm—Oblon, Spivak, McClelland, Maier & Neustadt

[57] ABSTRACT

The connection consists of a module (2) for connecting a pipe-line, free to swivel around a hollow screw (1) comprising a flap valve which is loaded by a weak return spring (5) to close against its sitting (3a) which constitutes the main passage of fluid flow through the apparatus. The flap valve (3) is integral with a rod (4), the free end of which is guided in the bore (10) of a plug (9), beyond a seal (6). The hollow screw also comprises means for conveying a small flow of fluid tapped from the sitting (3a) in order to fill an installation downstream of the apparatus, after which the flap valve (3) is opened by the effect of pressure. The apparatus is designed in two versions, one admitting pressure to the network via the module (2) and the other via the end of the hollow screw (1). Applications for pneumatic engineering.

17 Claims, 5 Drawing Sheets

STARTER CONNECTION FOR PROGRESSIVE PRESSURIZING OF PNEUMATIC INSTALLATIONS

The present invention concerns connector-starters for progressive pressurization of pneumatic installations. It especially concerns those connector-starters which are to be attached to transmitting or receiving pneumatic components.

It frequently occurs that during the cut-off of compressed air which supplies a pneumatic installation, the thrusters it uses are voluntarily or involuntarily disturbed from their normal position. The sudden return of pressure via the sectioning valve is then accompanied by shocks that are harmful to equipment and can result in bodily harm. To reduce these dangers, apparatus known as starters exist which ensure during the arrival of compressed air, firstly, a progressive filling which permits activators to gently regain their position, then fully open the passage to a normal flow for installation operation.

These starters are fixed components, bulky and costly, and require the use of piping connectors. Moreover, they are designed to be installed at the head of the installation's internal air distribution network, they protect the entire volume, resulting in a longer waiting time for filling, when in fact, only certain actuators actually require protection.

SUMMARY OF THE INVENTION

The present invention of connector-starters makes it possible to avoid these disadvantages by creation of two different apparatus versions in respect to their use, but which both replace the traditional connectors for which they are a substitute while continuing to ensure starter operation. The first version of these apparatus is designed to be screwed into receiving pneumatic components, such as distributors; fluid arrives via the connected pipeline. The second version of the apparatus is designed to be screwed onto transmitting pneumatic components, such as sectioning and purge valves known as section switches; in this case, the air flow exits through the connected pipeline.

In each version, in accordance with the invention a connector-starter is presented in an elbow joint form known as a "banjo", which includes a module equipped with means for pipeline connection, this module being adjustable around a hollow screw when attached to the connector, and interchangeable according to the nature and diameter of the pipeline to be connected. The hollow screw includes means for controlled and reduced filling flow of the downstream installation, established in bypass from a seat that is closed at the rest position by a valve and which constitutes the main passage through the apparatus; the valve is pushed closed by a light return spring whose strength is insignificant in relation to the forces brought into play by pressures and just sufficient to overcome friction. The valve is integral to a smaller section rod which extends in the direction opposite from the seat toward the extremity of the opposing hollow screw at its threaded attachment extremity. The free extremity of this rod enters the open air following a gasket through which it slides and is guided inside of the bore of this gasket's retaining plug which closes the apparatus. The return spring is supported by the plug and a valve shoulder. The cylindrical wall of the hollow screw is perforated by peripheral holes which ensure, when the valve is open, the full passage of fluid between the threaded opening and the vortex chamber of the adjustable model connected to the pipeline.

BRIEF DESCRIPTION OF THE DRAWINGS

Other advantages and characteristics of the invention will be better understood after reading the description following the several creation modes, accompanied by a reading of the drawings (where the same elements are designated with the same numerical references), these include the following.

DETAILED DESCRIPTION OF THE PREFERRED EMBODIMENTS

Figure 1:
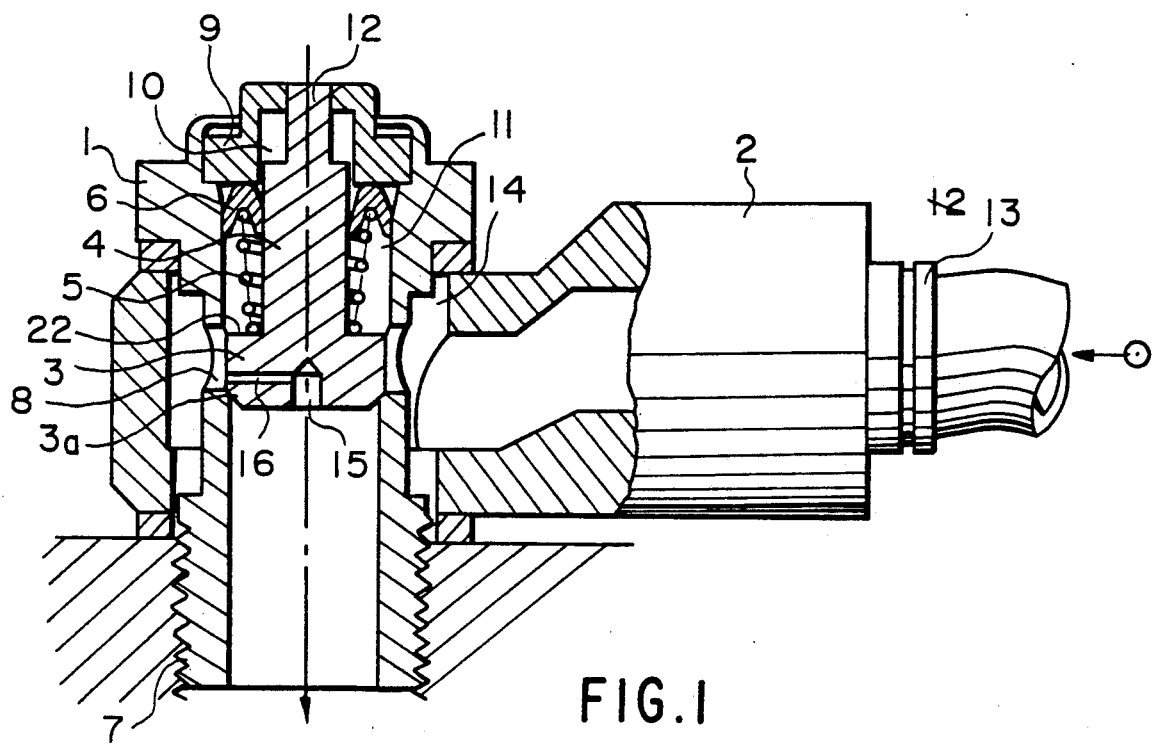
FIG. 1 is a longitudinal section of the first type of connector-starter construction based on the version of the invention attached to a pneumatic receiving component.

Based on FIG. 1, the connector-starter consists of a module 2 which includes an opening 13 for connection to a pipeline by which compressed air arrives, and a hollow screw 1 around which it can be adjusted. A distribution vortex chamber 14 is provided between module 2 and the hollow screw 1 and permits a connection between the pipeline and the interior of the hollow screw, via a series of peripheral holes 8 made in the wall. The hollow screw 1 presents a threaded opening 7 which in this version constitutes the output, suitable for screwing into the supply opening of a receiving apparatus, separated from holes 8 by a valve 3 that closes seat 3a at rest position by the strength of a return spring 5. Valve 3 is integral to a rod 4 extending in the direction opposite to its support surface, through a double lipped U profile gasket. The extremity of rod 4 following the gasket 6 enters the open air and is guided into a bore 10 and plug 9 which closes the apparatus and to which gasket 6 is applied. The spring 5 works in extension and, at one end, presses into the hollow of the gasket 6 profile, and at the other onto the shoulder 22 formed by the junction of valve 3 and its smallest section rod 4. The static gasket 6 whose external lip is in contact with the internal wall of the hollow screw 1, delimits with valve 3 closing its seat 3a, a chamber 11 opening onto vortex chamber 14 via peripheral holes 8.

According to FIG. 1, the valve 3 is longitudinally cut on its support face by a channel 15 connected with a calibrated radial channel 16 which issues into chamber 14. When pressure P1 arrives from the upstream supply network, it will flow through channels 15 and 16 toward a downstream installation which it progressively fills with increasing pressure P2.

Simultaneously, pressure P1 in chamber 11 works to close valve 3 by its action on the difference between the valve sections and its rod in gasket 6.

The downstream pressure of P2 works to open the valve by its action on the full section. When the balance of these antagonistic forces is established, valve 3 opens, freeing the full passage. By calling the valve section on seat 3a: S1, and by calling the rod 4 in gasket 6: S2, and the strength in spring 5: R, opening takes place when the following occurs:

$$P1(S1-S2)+R=P2\times S1$$

Rod 4 includes at its free extremity a narrowing 12 which extends outside of the apparatus when the valve is opened and can be used as a visual indicator. The shoulder formed by the narrowing 12 and its junction with rod 4, which stops at the bottom of the guiding bore 10 of plug 9, limits the travel of the valve—rod assembly. When the upstream section switch purges, the fluid will flow through the apparatus in the reverse direction and maintain the valve open as long as the value P acting on the rod section balances spring strength, i.e. for a value such as PS2=R.

Below this value, the valve closes, a weak heel of pressure succeeds in emptying itself rapidly through channels 15 and 16. The very weak force of spring 5 thus permits the absence of a unidirectional purge valve.

Figure 2:
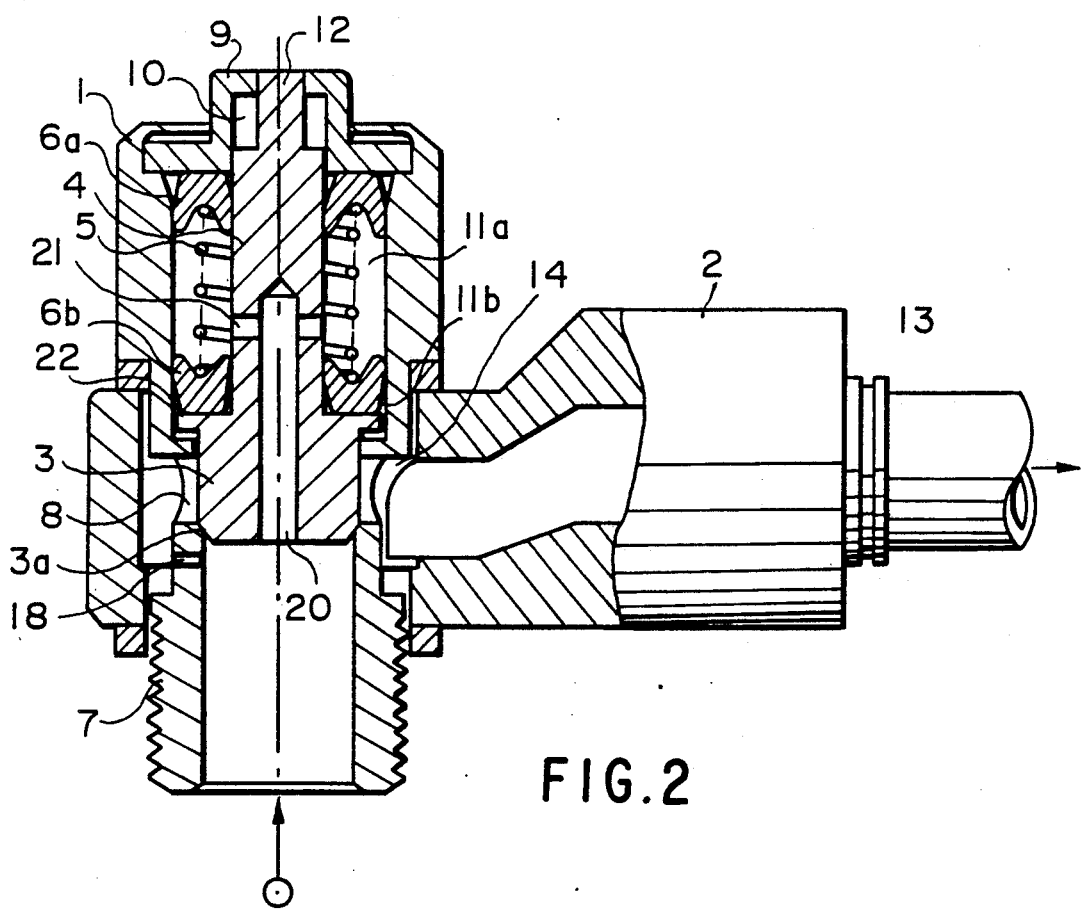
FIG. 2 is a longitudinal section of the first type of connector-starter construction based on the version of the invention attached to a pneumatic transmitting component.

In the connector-starter in FIG. 2, which is attached to a transmitting component, the pressure coming from the upstream network arrives via the threaded opening of the hollow screw and exits downstream through the connectable opening of the adjustable module. According to FIG. 2, this version differs from the preceding version in FIG. 1 mainly by the fact that the hollow screw 1 includes a supplementary double lipped U profile gasket 6b which is supported by shoulder 22 at the junction of valve 3 with its rod 4, and whose external lip can slide in a sealed fashion onto the internal cylindrical wall of hollow screw 1. The gasket 6b delimits with the static gasket 6a a first chamber 11a open to the support face of valve 3 and feed opening 7 by a longitudinal channel 20 in connection with a radial channel 21 placed in the valve-rod assembly. A second chamber 11b, delimited by gasket 6b and valve 3 during closing of its seat 3a, is open to the pipeline connected to module 2 by peripheral holes 8 and vortex chamber 14.

According to FIG. 2, during opening of the upstream section switch where the apparatus is directly screwed on, pressure P1 of the network flows through a calibrated hole 18 placed in the wall of the hollow screw 1 between the feed opening 7 and valve 3, to enter vortex chamber 14 and progressively fill the downstream installation with an increasing pressure P2. Pressure P1 works to close valve 3 over its entire section and closes by its action in chamber 11a on the vortex section resulting from the difference in the external diameter of gasket 6b and the internal diameter of gasket 6a. The downstream pressure P2 works to close the valve by its action on the vortex section resulting from the difference between the external diameter of gasket 6b and that of valve 3 on seat 3a. If we call the valve section: S1, and the rod section 4 in and gasket 6a: S2, the section of the external circle of gasket 6b: S3, and the strength of spring 5: R, the valve opens to full flow when the balance of these antagonistic forces is established, i.e., when:

$$P1(S3-S2-S1)+R=P2(S3-S1)$$

As in the previous version in accordance with FIG. 1, the valve remains open as long as the value P which flows through the apparatus and acts on S2 balances the force of spring 5, i.e., as long as PS2=R.

Figure 3:
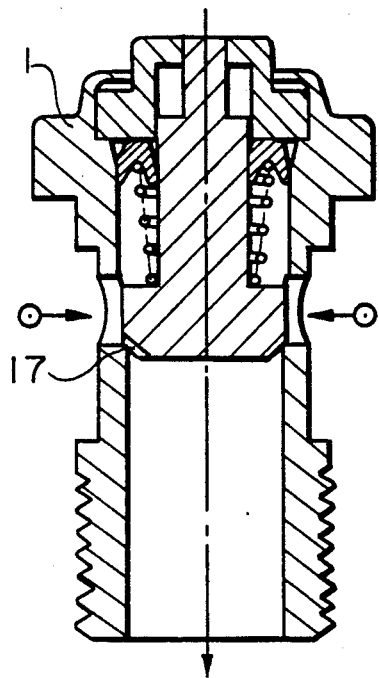
FIGS. 3 to 6 illustrate variants of the means used for controlled and reduced flow filling of the connector-starter in FIG. 1, FIGS. 7 and 8 illustrate the means used for adjustment of progressive filling flow of the connector-starter in FIG. 2.

FIG. 3 shows another means for establishing a reduced flow of fixed value progressive filling in deviation from the main passage 3a: according to FIG. 3, a groove 17 of calibrated width and depth is cut onto the span of valve 3 on seat 3a.

Figure 4:
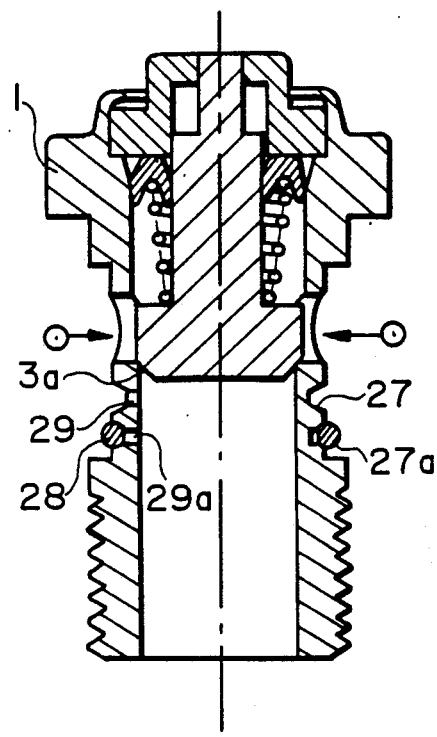
Figure 5:
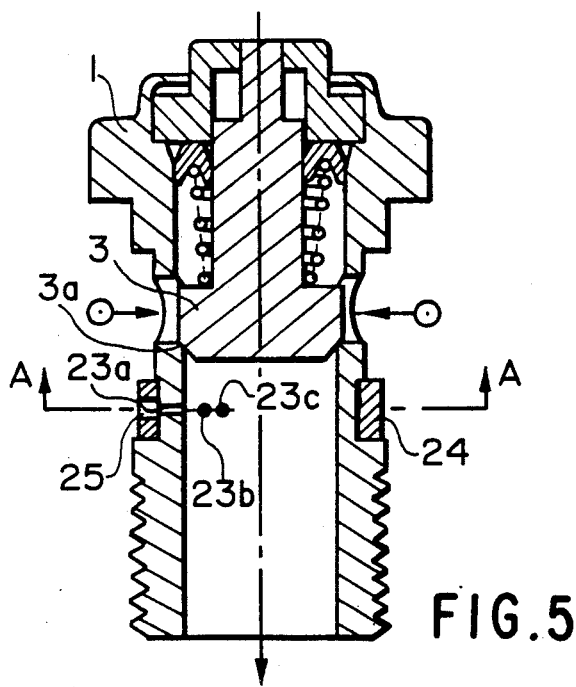
Figure 6:
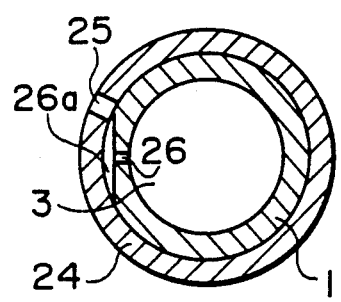

FIGS. 4, 5 and 6 show different means for establishing a reduced flow of variable value progressive filling, in deviation from the main passage 3a, means that are more especially but not exclusively applicable to the version of the apparatus described in FIG. 1.

According to FIG. 4, the circular channels 27 and 27a are cut in the external wall of the hollow screw 1 at the level of vortex chamber 14 of adjustable module 2. The wall of the hollow screw is crossed by different calibrated holes 29 and 29a, each of them starting from the bottom of its respective channel 27 and 27a. As represented, the mounting of an O-ring 28 in channel 27a masks the hole 29a allowing passage of reduced flow fluid via the single hole 29. By suppressing the O-ring 28 we thus have three different reduced flow values available, the value of each being the sum of the two others.

According to FIG. 5, a rubber ring 24 encloses the external wall of the hollow screw 1 at the level of vortex chamber 14 of module 2. This ring 24 includes a hole 25 which can be made to correspond, by rotation of the ring, with one of the plurality of different calibrated holes 23a, 23b, 23c perforated in the wall of the hollow screw and establishing the connection between the threaded opening 7 and the vortex chamber 14, these holes being smaller than hole 25.

FIG. 6 represents, by a lateral section AA', a variant of the previous process in accordance with FIG. 5, by which hole 25 of ring 24 can be adjusted on any point of the semi-circular groove 26a extending from one part to the other of a single hole 26 in the wall of hollow screw 1, and whose depth and/or width progressively decrease as they move away from the hole.

Figure 7:
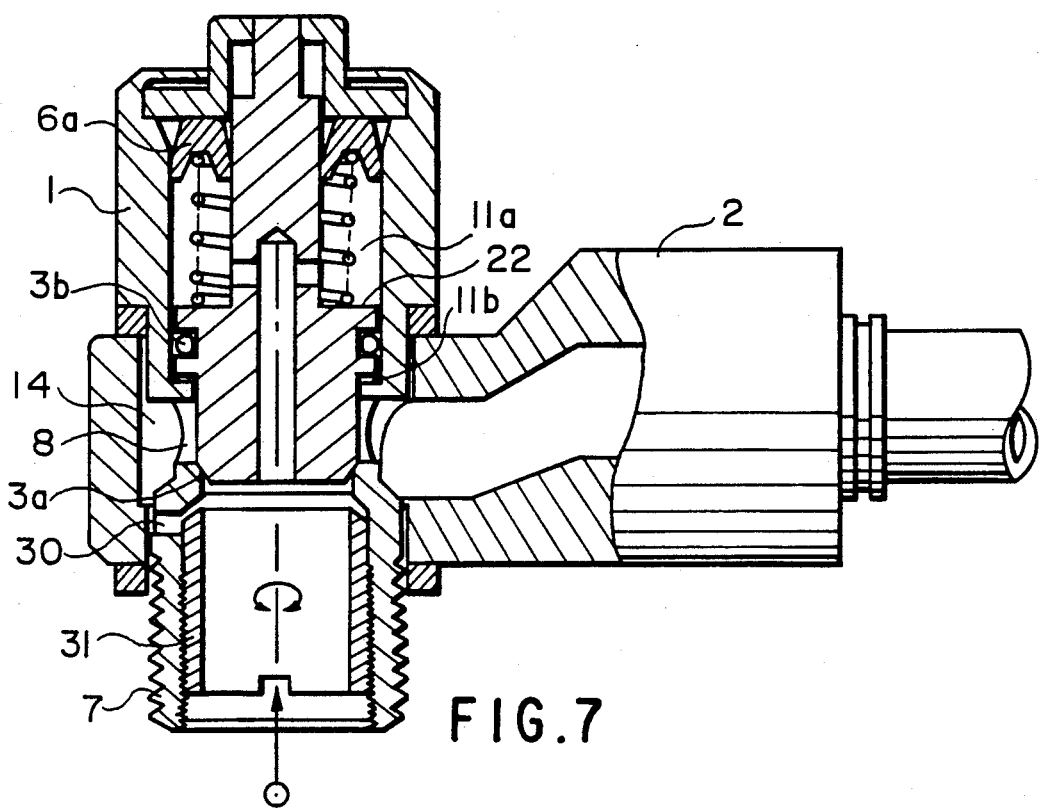
Figure 8:
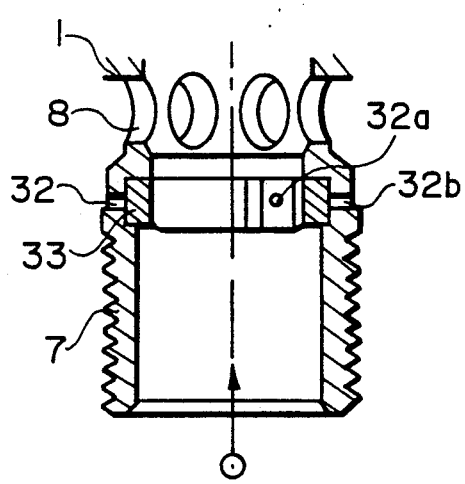

FIG. 7 and 8 show the means used to establish a reduced flow of variable value progressive filling in deviation from the main passage 3a, means which are more specially but not exclusively applicable to the version of the apparatus shown in FIG. 2.

According to FIG. 7, the internal of the threaded input opening 7 of the hollow screw 1 receives a threaded ring 31 which can be screwed in by using an appropriate tool. The extremity of this ring 31 can partially mask, as desired, a hole 30 which establishes a connection between the threaded opening 7 and vortex chamber 14 of module 2.

In accordance with FIG. 8, the threaded opening 7 includes a semi-circular elastic ring 33, suitable for adjustment by rotation in a retention channel using an appropriate tool, so that by the clearance between its extremities only a hole 32, 32a or 32b perforated in the wall of the hollow screw and establishing the connection between the threaded or opening 7 and the vortex chamber 14 of module 2 is unmasked.

FIG. 7 also illustrates another means of establishing a seal between chamber 11a and chamber 11b, by using an O-ring 36b mounted in a peripheral channel of valve 3 instead of the double lipped gasket 6b.

According to FIGS. 1 and 2, we note that the two versions of connector-starters are only differentiated by the presence of an extra gasket and channels 20 and 21 of the rod-valve assembly. The construction of these two types of apparatus in the same size can thus be done using common elements, such as plug 9 and the hollow screw 1 whose dimensions will be the same as those of the apparatus belonging to the version described in FIG. 2. We also note that the presence of a valve 3 gasket on seat 3a is not indispensable, where a slight leak at this level's only consequence is to increase the reduced flow, without harming the perfect operation of the apparatus.

Figure 9:
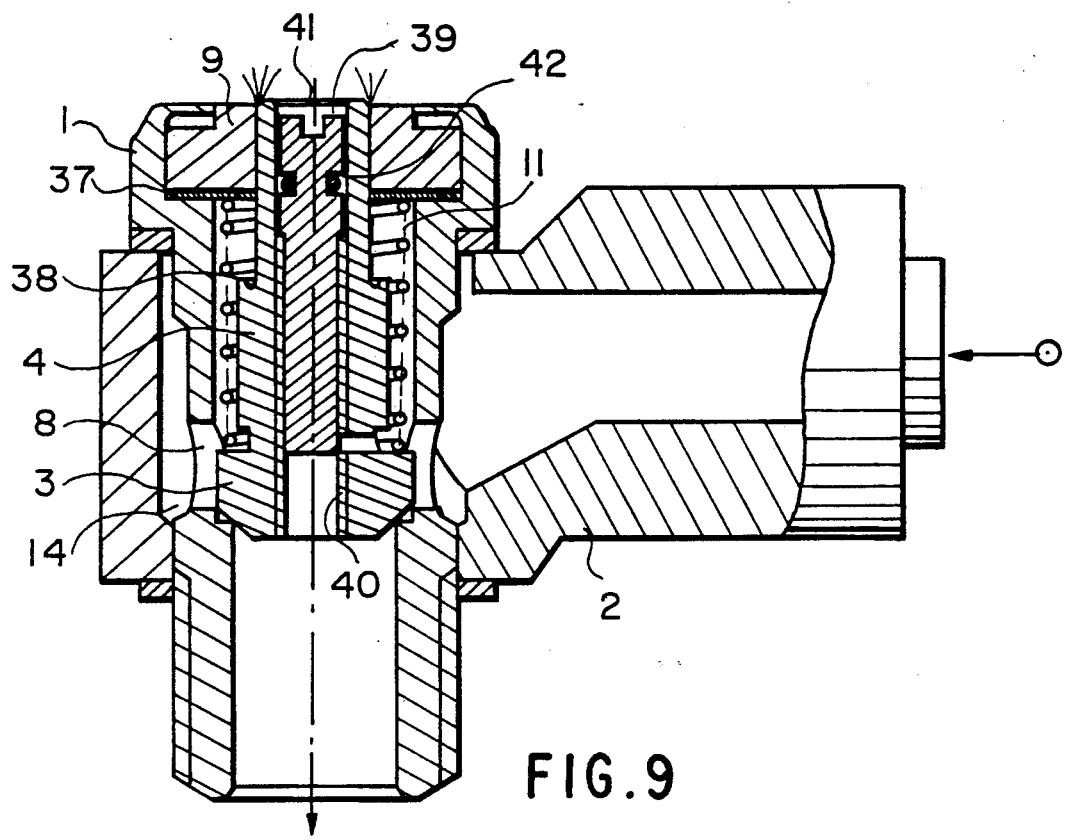
FIG. 9 is a longitudinal section of another type of connector-starter construction based on the invention where the version is attached to a pneumatic receiving component.

In the connector-starter in FIG. 9, the type attached to a receiver component, a sheet gasket 37 replaces the double lipped gasket 6 in FIG. 1. The sheet gasket 37 is tightened between hollow screw 1 and plug 9, without ensuring the seal around rod 4. Moreover, the shoulder formed by the narrowing of rod 4 presents a circular peripheral span 38 which will be applied to gasket 37 when the valve is opened. Thus, when pressure arrives into the connector by module 2, as long as valve opening has not taken place, a slight leak of compressed air around the top of rod 4 will indicate progressive pressurization and its duration.

Figure 10:
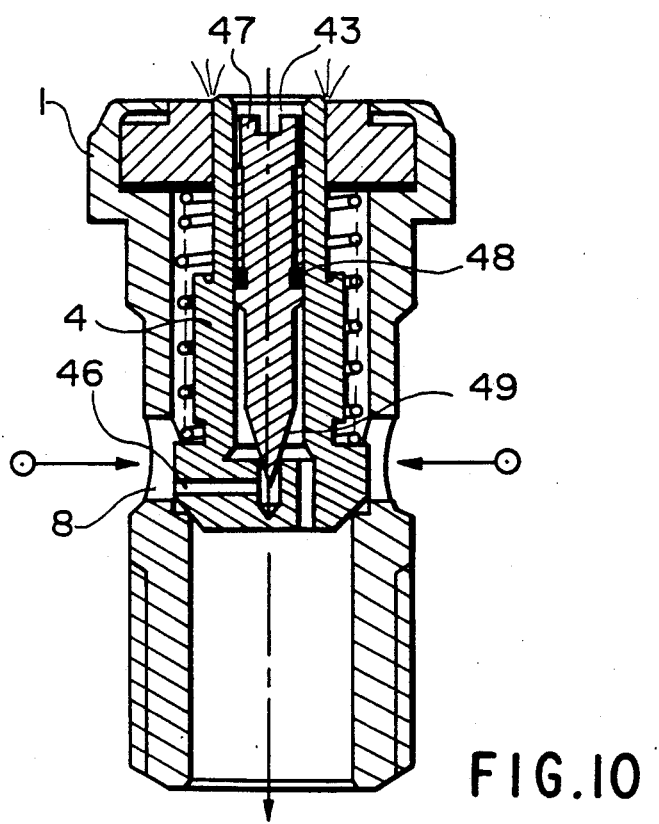
FIG. 10 illustrates a variant of the means used for controlled and reduced flow filling for the connector-starter in FIG. 9.

FIG. 9 also illustrates, as well as FIG. 10, other means for establishing a reduced flow of variable value progressive filling, applicable to the version of the apparatus attached to a receiver component. These means present the advantage of allowing adjustment via the valve rod extremity.

On FIG. 9, the rod-valve assembly is crossed by a longitudinal channel 39 whose lower part is threaded. In longitudinal channel 39, a radial pipe 40 opens outward and is open at its other end onto chamber 11 which communicates by holes 8 with chamber 14.

In channel 39, a rod 41 is screwed and supplied with gasket 42, whose lower extremity is slightly bevelled, and more or less closes the opening of radial pipe 40.

According to FIG. 10, the valve-rod assembly presents a longitudinal bore 43 open at the upper extremity of rod 4, and whose lower extremity is flared. One or more lateral pipes 44 issue into the latter which are also open to the orifice of hollow screw 1, and the longitudinal pipe 45 communicating with a radial pipe 46 open by a hole 8 onto vortex chamber 14.

A rod 47 provided with a gasket 48 is screwed into bore 43, partially threaded, the rod's lower extremity forms an injector needle 49 inserted into the opening of pipe 45 which more or less closes it. In this form of construction, the compressed air will arrive by holes 8 into pipes 46 and 45, then into pipe(s) 44.

Figure 11:
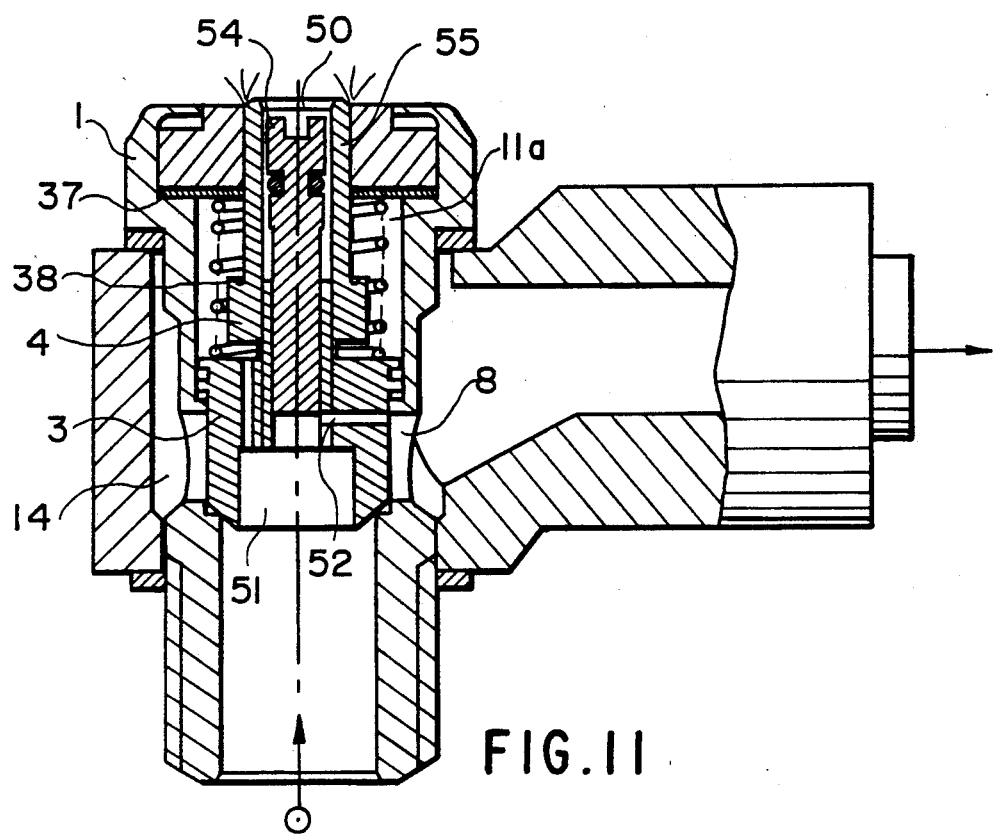
FIG. 11 is a longitudinal section of another type of connector-starter construction based on an invention where the version is attached to a transmitting component.

The connector-starter in FIG. 11 is the type attached to a transmitter element, compressed air arrives by the opening of a hollow screw 1. Like the connector-starter in FIG. 9, it includes a flat gasket 37 which surrounds rod 4 at the upper extremity of chamber 11a which, during progressive filling presents a slight leak around the top of rod 4, up to the valve opening for which the span 38 comes into contact at gasket 37.

Figure 12:
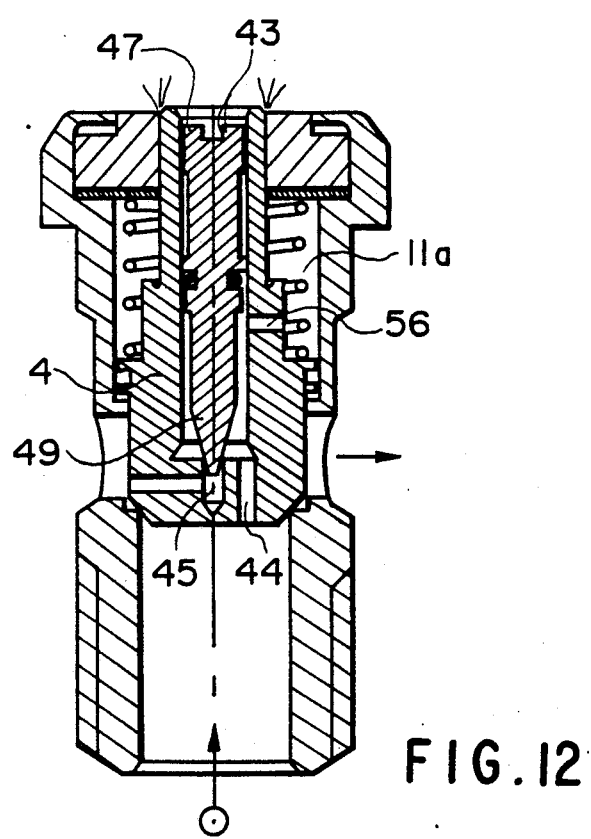
FIG. 12 illustrates a variant of the means used for controlled and reduced flow filling of the connector-starter in FIG. 11.

FIG. 11 also illustrates, as well as FIG. 12, the means for establishing a reduced flow of variable value filling, applicable to the version of the apparatus fixed on a transmitting component.

In FIG. 11, the valve-rod assembly is crossed through by an upper bore 50 extended by the lower bore 51 with the largest diameter.

The radial pipe 52 runs from the bore 50 to chamber 14 by means of a hole 8, while one or more longitudinal direction channels 53 run to the bottom of bore 51 at chamber 11a. In the bore 50, whose lower part is threaded, a rod 54 provided with a gasket 55 is screwed, whose lower extremity, slightly bevelled, more or less blocks the opening of pipe 52.

On FIG. 12, the valve-rod assembly has the same arrangement as that in FIG. 10, with an rod-injector needle 47, 49 more or less blocking the opening of pipe 45, only one or more extra pipes 56 are planned between bore 43 and chamber 11a for pressurization of the latter.

The same remark that applies to FIGS. 1 and 2 can be made concerning the connector-starters of each version equipped with reduced flow adjustment injector needle devices: they are only differentiated by the presence or non-presence of a gasket at the base of chamber 11A (in the case where this gasket is a lipped gasket 6b), and by the presence or non-presence of pipe 56 of the rod-valve assembly which makes it possible to create two types of apparatus of the same size using common elements.

What is claimed is:

1. Connector-starter for progressive pressurization of pneumatic installation comprising:
    an elbow joint composed of a hollow screw with a threaded opening at one extremity for attachment of the hollow screw into an opening of a pneumatic component, and
    a separable and adjustable module,
    wherein the hollow screw contains a mechanism composed of a valve blocking a seat thereof at a rest position thereof, said seat comprising a main passage for fluid through the apparatus, a light return spring of insignificant force in relation to forces by arising from fluid pressure, said valve being integral with a rod extending in a direction opposite to the seat and toward an extremity of the hollow screw opposite to said threaded opening, and whose free extremity is guided in a bore of a plug which closes the hollow screw, the spring being co-axial to the rod and having a section smaller, at the location of the free extremity, than that presented by the valve on said seat, and wherein the hollow screw includes means for producing a reduced flow of fluid bypassing the seat for filling the component downstream from the seat.

2. Connector-starter in accordance with patent claim 1, wherein said rod slides within a double lipped gasket applied onto the plug and whose outer lip seals a cylindrical chamber delimited by the seat closed by the valve and opening into a vortex chamber of a module and its opening via peripheral holes in the wall of the hollow screw, the spring being supported at one end by a gasket profile, and at the other end by a shoulder formed at a junction of the valve and the rod.

3. Connector-starter in accordance with patent claim 1, wherein the rod slides in a sheet gasket tightened between the hollow screw and the plug and allowing a slight leak around the rod from a cylindrical chamber delimited by the seat closed by valve and opening into a vortex chamber of a module via peripheral holes in the wall of the hollow screw, the spring being supported by one end on a gasket and at the other end by a shoulder formed at a junction of the valve and the rod (4), the leak around the rod being suppressed during opening of the valve by a span at the periphery of the rod shoulder coming into contact with the gasket.

4. Connector-starter in accordance with one of patent claims 1 to 3, wherein the assembly formed by the valve and the rod includes a second gasket on the valve, which second gasket delimits with the first gasket a first cylindrical chamber containing the spring and open on a support face of the valve on the seat, by a longitudinal channel and a radial pipe of the rod opening between the two gaskets, the second gasket being movable on the rod and delimiting with the seat a second chamber open communicating, via peripheral holes of the hollow screw, with a vortex chamber of a module.

5. Connector-starter in accordance with patent claim 4, wherein the second gasket is a double lipped gasket with a U profile, maintained in position on the shoulder of the valve-rod assembly by the spring which is supported at its ends by the two gaskets.

6. Connector-starter in accordance with patent claim 4, wherein the second gasket is an O-ring mounted at the periphery of the valve.

7. Connector-starter in accordance with one of patent claims 2 to 3, wherein the means for producing a reduced flow of fluid bypassing the seat comprises a longitudinal channel in an assembly formed by the valve and the rod, said channel being open onto the support face of the valve on the seat, and communicating with a radial pipe of calibrated diameter opening into the chamber.

8. Connector-starter in accordance with one of patent claims 1 to 3, wherein the means for producing a reduced flow of fluid bypassing the seat comprises a groove of calibrated width and depth, placed along the length of the valve on the seat.

9. Connector-starter in accordance with one of patent claims 1 to 3, wherein the means for producing a reduced flow of fluid bypassing the seat comprises one hole of calibrated diameter communicating with a vortex chamber of a module and perforated in the wall of the hollow screw between the seat and the threaded opening.

10. Connector-starter in accordance with one of patent claims 1 to 3, wherein the means for producing a reduced flow of fluid bypassing the seat includes means for adjusting this flow.

11. Connector-starter in accordance with patent claim 10, wherein the means for producing and adjusting a reduced flow of fluid bypassing the seat includes holes of different calibrated diameters communicating with a vortex chamber between the seat and the threaded opening, each of the holes opening into the bottom of circular channels on the outer wall of the hollow screw and whose profile is suitable for receiving an O-ring.

12. Connector-starter in accordance with patent claim 10, wherein the means for producing and adjusting a reduced flow of fluid bypassing the seat includes holes, or a semi-circular groove of tapering depth and width extending from one end of the hole (26) to the other, communicating with the vortex chamber placed on the same circle in the wall of the hollow screw between the seat and the threaded opening, and a ring of elastic material with another hole at least equal in size to said holes, surrounding the hollow screw and able to be adjusted in rotation so as to be superimposed on one of the holes.

13. Connector-starter in accordance with patent claim 10, wherein the means for producing and adjusting a reduced flow of liquid bypassing the seat includes an interior screw in the threaded opening of the hollow screw, the interior screw being longitudinally perforated to carry the full flow of fluid, and being screwable by means of an appropriate tool to partially close a hole in the wall of the hollow screw between the seat and the threaded opening, and which opens into a vortex chamber of a module.

14. Connector-starter in accordance with patent claim 10, wherein the means for producing and adjusting a reduced flow of liquid bypassing the seat includes an elastic semi-circular ring which can slide by rotation inside an internal circular groove in the threaded opening of the hollow screw by means of an appropriate tool, so as to unmask one or more holes placed in the wall of the hollow screw at the bottom of the groove between the seat and the threaded opening, and which opens into a vortex chamber of a module.

15. Connector-starter in accordance with patent claim 10, wherein the means for producing and adjusting a reduced flow of fluid bypassing the seat includes a threaded rod provided with a joint, screwed into a channel longitudinally crossing an assembly formed by the valve and the rod, the lower extremity of the rod partially closing a radial pipe opening into a chamber.

16. Connector-starter in accordance with patent claim 10, wherein the means for producing and adjusting a reduced flow of liquid bypassing the seat includes an injector needle open at the top of an assembly formed by the valve and the rod, the injector needle being engaged in the opening of a longitudinal pipe at the bottom of the bore, opened by a hole in a chamber, the bore communicating with the opening of the hollow screw beneath a span via one or more pipes.

17. Connector-starter in accordance with patent claims 1 to 3 wherein the free extremity of the rod includes a narrowing of its exterior section, a shoulder formed by the narrowing and the section of the rod stops at the bottom of the bore in a manner to mechanically limit the valve opening travel, the extension of the narrowing making it possible to visualize a degree of valve opening.

* * * * *